United States Patent [19]
Nakamura

[11] Patent Number: 4,712,229
[45] Date of Patent: Dec. 8, 1987

[54] MULTIPLE ACCESS RADIO TELEPHONE SYSTEM SELECTIVELY OPERATING ON FULL-DUPLEX AND HALF-DUPLEX MODES

[75] Inventor: Hiroyasu Nakamura, Tokyo, Japan

[73] Assignee: NEC Corporation, Tokyo, Japan

[21] Appl. No.: 30,400

[22] Filed: Mar. 26, 1987

[30] Foreign Application Priority Data

Mar. 26, 1986 [JP] Japan ................................. 61-69279

[51] Int. Cl.⁴ .............................................. H04Q 7/01
[52] U.S. Cl. ........................................ 379/58; 379/56; 379/63; 455/56; 455/33
[58] Field of Search ................... 379/56, 58, 63, 33 V, 379/333; 375/56; 370/31, 95; 455/56, 33, 69

[56] References Cited

U.S. PATENT DOCUMENTS

| | | | |
|---|---|---|---|
| 4,037,158 | 7/1977 | Eastmona | 325/22 |
| 4,288,868 | 9/1981 | Grotjohann et al. | 370/30 |
| 4,288,869 | 9/1981 | Kolodzey et al. | 370/31 |
| 4,450,555 | 5/1984 | Pays | 370/31 |
| 4,549,293 | 10/1985 | Christian et al. | 370/95 |
| 4,599,719 | 7/1986 | Breen et al. | 370/24 |
| 4,635,285 | 1/1987 | Coombes | 379/63 |
| 4,661,970 | 4/1987 | Akaiwa | 379/61 |
| 4,672,601 | 6/1987 | Ablay | 370/31 |

*Primary Examiner*—Robert Lev
*Attorney, Agent, or Firm*—Sughrue, Mion, Zinn, Macpeak & Seas

[57] ABSTRACT

A multiple access radio telephone system is connected to a telecommunication switching system and serves a group of N remote stations through M two-way radio channels (where M is smaller than N). The remote stations have corresponding subscriber line terminals in the switching system and are accessible to one of the two-way radio channels selected by a concentrator. For efficient channel utilization, the concentrator establishes a full-duplex mode connection between one of the corresponding subscriber line terminals of the switching system and the selected two-way radio channel in response to a request for an extragroup call and establishes a half-duplex mode connection between two of the remote stations through the selected two-way radio channel in response to a request for an intragroup call.

12 Claims, 3 Drawing Figures

FIG. 2
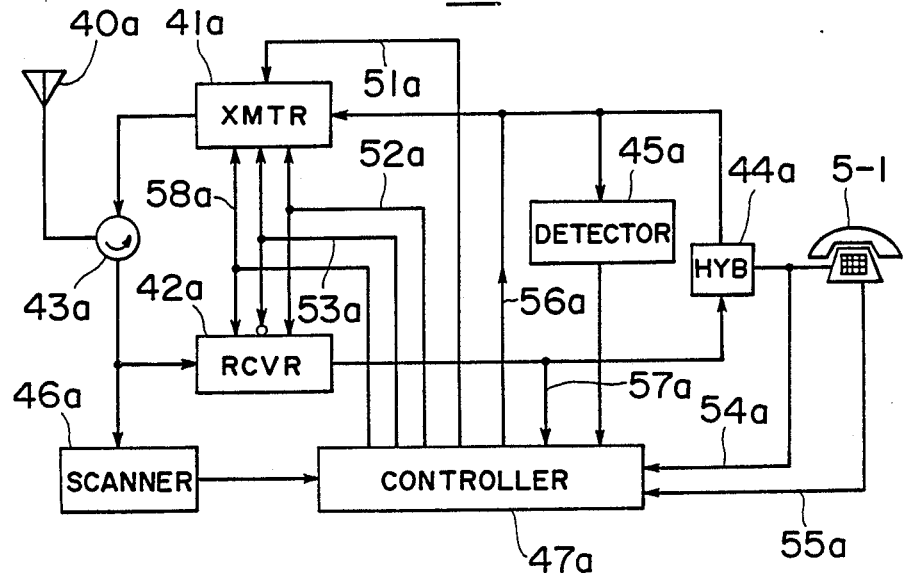
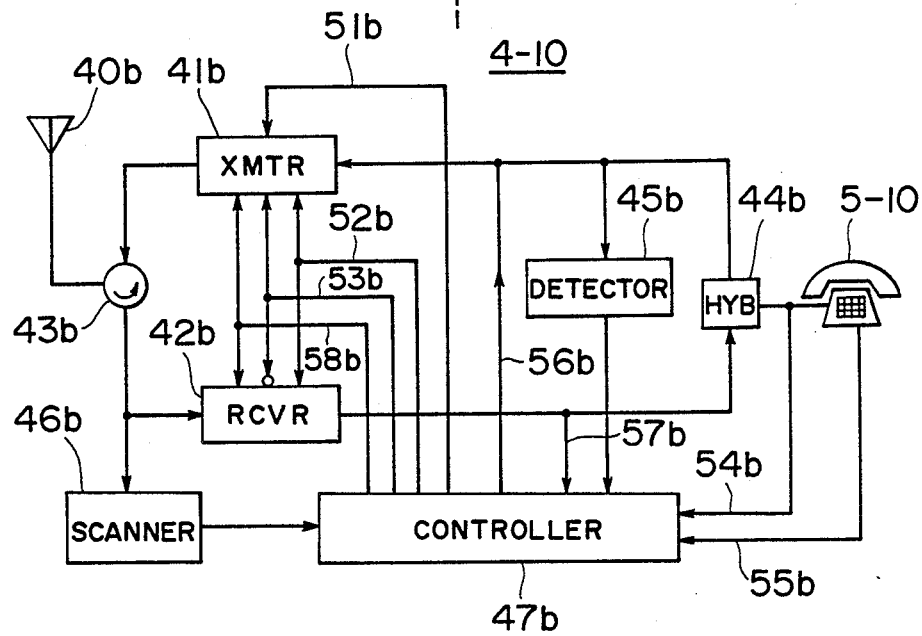

4,712,229

MULTIPLE ACCESS RADIO TELEPHONE SYSTEM SELECTIVELY OPERATING ON FULL-DUPLEX AND HALF-DUPLEX MODES

BACKGROUND OF THE INVENTION

The present invention relates generally to multiple access radio telephones and more specifically to a multiple access radio telephone system which provides concentration by switching remote subscriber stations to a smaller number of two-way radio channels and provides deconcentration by switching the radio channels to subscriber line terminals of a telecommunication switching system which correspond to the remote stations.

As illustrated in FIG. 3, a prior art multiple access radio telephone system comprises a line concentrator 60 which is formed by a switching matrix 61 having two pairs of terminals for connection to transceivers 71 and 72 and ten pairs of terminals for connection through hybrid transformers 8-1 through 8-10 to line terminals $L_1$ through $L_{10}$ of a telephone switching system 90. Transceivers 71 and 72 establish two-way radio channels to a group of remote subscriber stations 100 which are in one-to-one correspondence with line terminals $L_1$ through $L_{10}$ of the switching system 90. The transceivers 71 and 72 share a common antenna to establish two-way radio channels on frequecies $f_1$, $F_1$, $f_2$ and $F_2$ with remote subscriber stations 100-1 through 100-10. A controller 62 controls the switching matrix 61 in such a manner that the remote stations are concentrated to a smaller number of radio channels and deconcentrated to the corresponding subscriber line terminals as viewed from the remote stations to the switching system. Calls between the remote stations and subscriber stations external to the remote station group, or "extragroup calls" involve one two-way radio channel and a switched incoming or outgoing connection by the telephone switching system through one of the transceivers 71 and 72. However, for calls to be established between any two of the remote stations, or "intragroup calls", a switched connection is established between transceivers 71 and 72 as marked by solid and dot lines through two radio channels. Thus, the prior art system prevents a third party from originating a call when an intragroup call is in progress.

SUMMARY OF THE INVENTION

It is therefore an object of the present invention to provide a multiple access radio telephone system which ensures channel utilization efficiency by operating a shared radio channel on a half-duplex mode during an intragroup call and operating the shared radio channel on a full-duplex mode during an extragroup call.

Specifically, the multiple access radio telephone system of the present invention is adapted to be connected to a telecommunication switching system which provides switched connections between subscriber line terminals thereof. The radio telephone system serves a group of N remote stations through M two-way radio channels (where M is smaller than N). The remote stations have corresponding subscriber line terminals in the switching system and are accessible to a selected one of the two-way radio channels. A concentrator is connected to the switching system and the radio channels for selecting an arbitrary one of the two-way radio channels and establishing a full-duplex mode connection between a switched one of the corresponding subscriber line terminals and the selected two-way radio channel in response to a first call-processing signal and establishing a half-duplex mode connection between two of the remote stations through the selected two-way radio channel in response to a second call-processing signal.

In operation, a full-duplex connection is established for extragroup calls from the telecommunication switching system to a remote station over the channel selected by the concentrator and a half-duplex connection is established over the selected channel between remote stations for intragroup calls. Half-duplex operation avoids radio frequency interference between the carriers of the same frequency transmitted simultaneously from the remote stations of the intragroup call. Only one two-way channel is thus required for both extragroup and intragroup calls.

BRIEF DESCRIPTION OF THE DRAWINGS

The present invention will be described in further detail with reference to the accompanying drawings, in which:

FIG. 2 is an illustration of details of the remote subscriber stations; and

DETAILED DESCRIPTION

Figure 1:
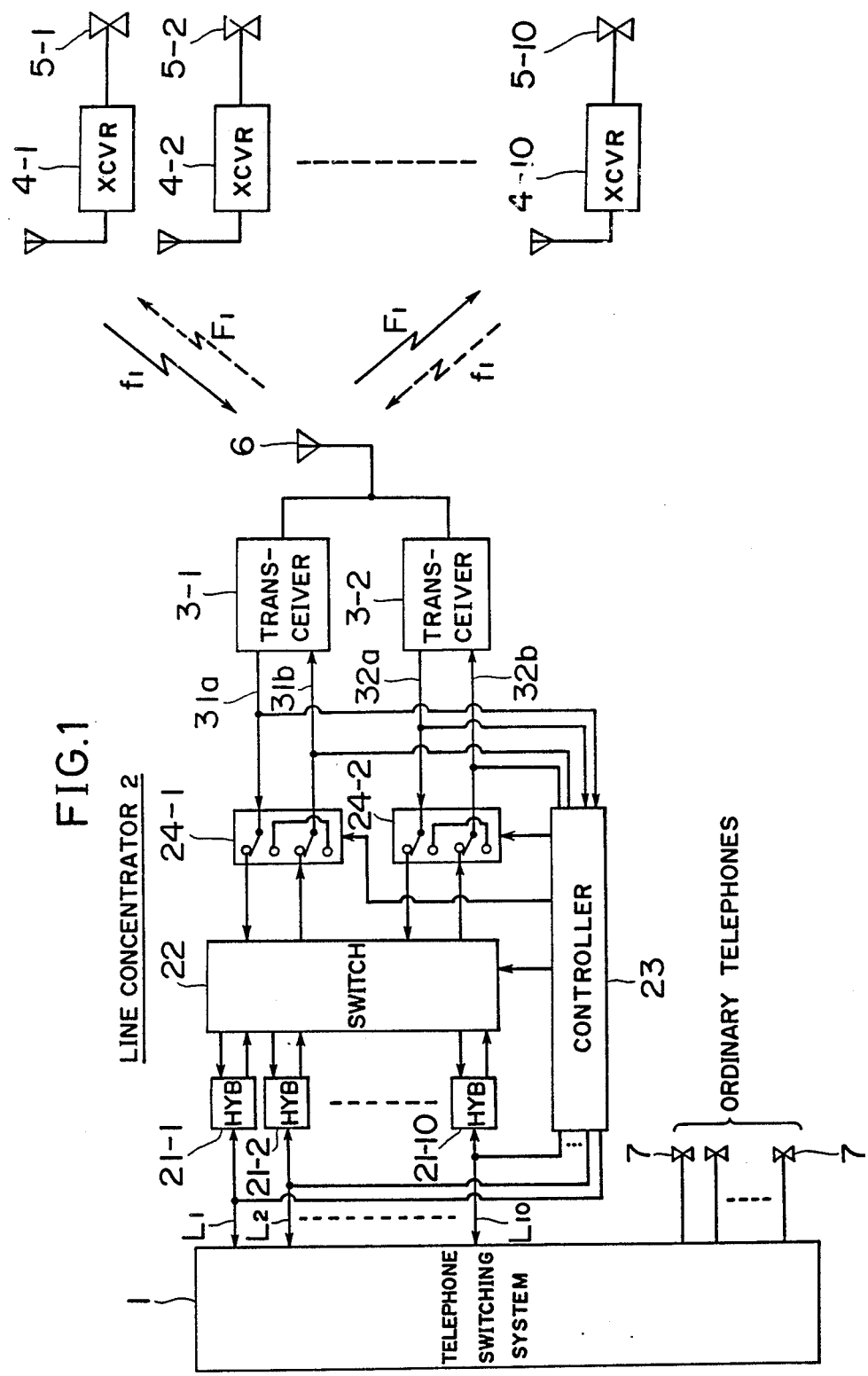
FIG. 1 is a circuit diagram of a multiple access radio telephone system according to the present invention.
Figure 3:
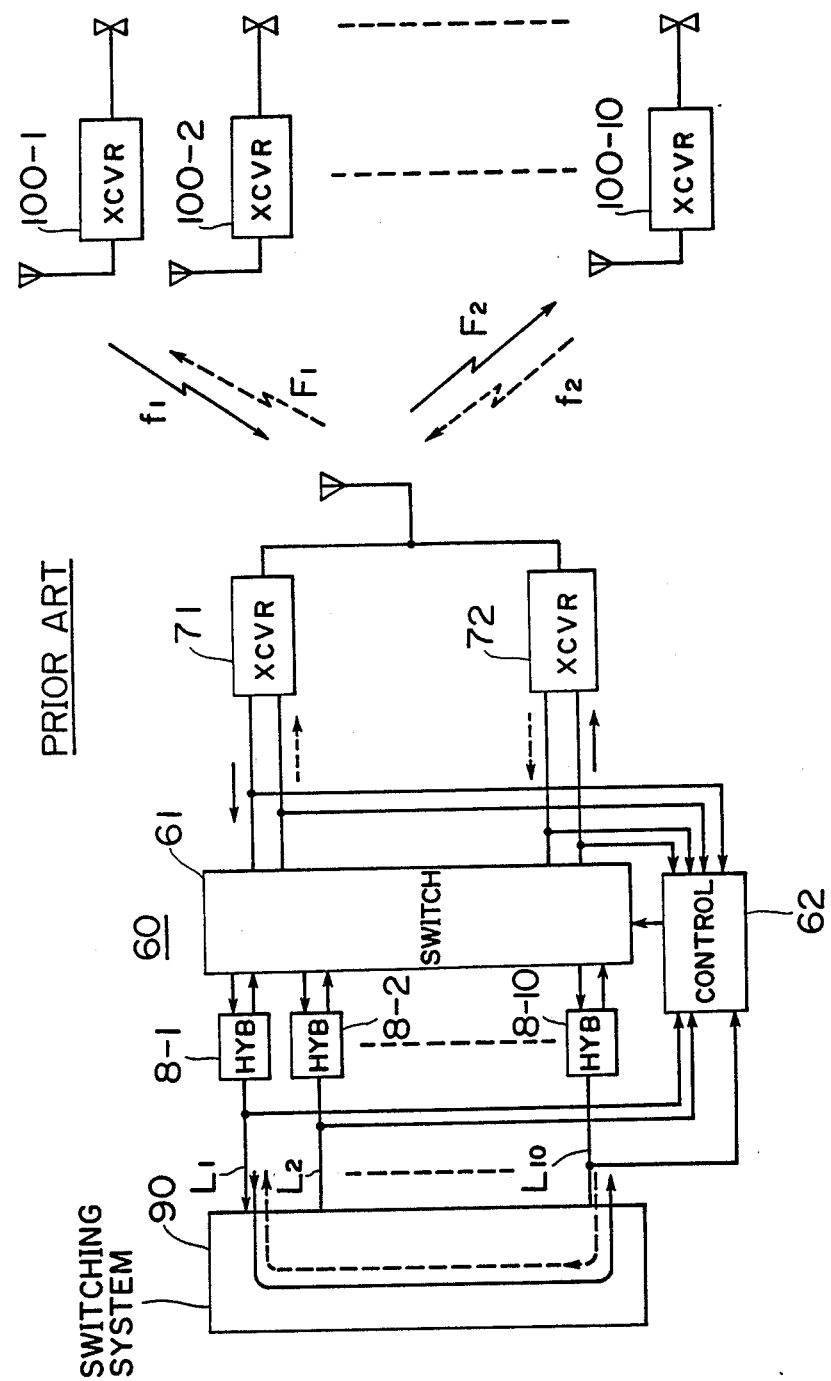
FIG. 3 is a block diagram of a prior art multiple access radio telephone system.

Referring now to FIG. 1, there is shown a multiple access radio telephone system connected to a conventional telephone switching system 1 to which ordinary telephones 7 are connected. The system comprises a line concentrator 2 including a plurality of 2-wire-4-wire converters, or hybrid transformer 21-1 through 21-10, a concentrator switching network 22, duplex mode switches 24-1 and 24-2, and a controller 23. The two-wire terminals of hybrid coils 21-1 through 21-10 are connected respectively to subscriber line terminals $L_1$ through $L_{10}$, respectively, the telephone switching system 1. The four-wire terminals of the hybrid transformers 21 are respectively connected to associated four-wire terminals of the concentrator switching network 22.

The radio telephone system further includes base station transceivers 3-1 and 3-2 which shares a common antenna 6 for establishing duplex radio channels #1 and #2 on the VHF or UHF band to a group of remote stations comprising transceivers 4-1 through 4-10 to which telephone sets 5-1 through 5-10 are respectively connected.

Base station transceiver 3-1 demodulates a signal at frequency $f_1$ received from a remote station and recovers its baseband signal and applies it to an output terminal 31a and modulates a baseband signal supplied to an input terminal 31b thereof on frequency $F_1$ for transmission to the remote stations. Base station transceiver 3-2, on the other hand, demodulates a signal at frequency $f_2$ from a remote station and recovers its baseband signal and applies it to an output terminal 32a and modulates a baseband signal supplied to an input terminal 32b thereof on frequency $F_2$ for transmission to the remote stations.

As viewed from the telephone switching system 1, the concentrator 2 provides concentration by switching subscriber line terminals to a smaller number of shared output lines, or radio channels #1 and #2 and when viewed from the remote stations the concentrator provides deconcentration by switching the shared radio channels to individual subscriber line terminals. To this end, the controller 23 provides selection of a frequency of the radio channels and allows the remote stations 4 to stay on the selected frequency for call setup and reception and controls the concentrator network 22 to establish a two-way path between a subscriber line terminal and a selected radio channel. In the present invention, the shared radio channels operate either on full-duplex or half-duplex mode depending on the state of the duplex mode switches 24-1 and 24-2. In the absence of a switching control signal which will be supplied from the controller 23, switches 24-1 and 24-2 establish connections between the network 22 and transceivers 3-1 and 3-2 to permit the radio channels to be operated on a full-duplex mode. In the presence of the switching control signal, they establish short-circuit connections between terminals 31a and 31b and between terminals 32a and 32b to permit the radio channels to be operated on a half-duplex mode. Controller 23 includes a busy/idle status memory for recording the busy/idle states of the individual remote stations in response to call setup and call clearing procedures.

The input and output terminals 31a, 31b, 32a and 32b of transceivers 3-1 and 3-2 are also connected to the concentrator controller 23 to enable it to monitor the busy/idle state of the shared radio channels #1 and #2.

Specifically, the controller 23 includes a preferential circuit that determines which one of the radio channels are idle. If both channels are idle, it preferentially selects one of the idle channels, typically the #1 radio channel (frequencies $F_1$ and $f_1$), by causing the transceiver 3-1 to send a frequency-$F_1$ carrier to all the remote stations. If the #1 radio channel is used, the controller 23 shifts the carrier frequency to $F_2$. As will be described, each remote station scans across the radio frequency spectrum to detect the frequency of the transmitted carrier to enable it to stay tuned to the selected channel for instant transmission and reception of call-processing signals. During a call setup process, the controller 23 receives source and destination address signals through a selected one of the transceivers 3-1 and 3-2. If the call is destined to a telephone station 7, the controller 23 directs the switching network 22 to establish a path between the selected transceiver and the subscriber line terminal of the remote station concerned and transfers the received destination address signal to the switching system 1 to establish a normal telephone connection by way of the switching system 1. If there is an incoming call from the switching system 1, the controller 23 receives the last digit of the destination address from switching system 1 and sends a selective calling signal to all remote stations to permit a called remote station to detect a match with the own address number and directs the switching network 22 to establish a connection between a switching system subscriber line terminal and a selected channel. If there is an intragroup call, the controller 23 proceeds to translate the destination address it receives from the originating remote station and sends a selective calling signal to all remote stations to permit a called remote station to detect it to establish an intragroup, half-duplex mode connection over a selected channel by way of the switched return path established by a selected one of switches 24 Controller 23 further includes a function for applying a make-busy signal to the subscriber line terminals $L_1$ to $L_{10}$ when an intragroup call is in progress.

Referring to FIG. 2, details of the remote stations are illustrated. Each remote-station transceiver 4 comprises an antenna 40, a transmitter 41 and a receiver 42 which are connected to a duplexer 43 for enabling the antenna 40 to be shared for both transmission and reception. A hybrid transformer 44 couples the telephone set 5 to the input terminal of transmitter 41 and the output terminal of receiver 42. To provide power savings, transmitter 41 remains in a disabled state and is rendered continuously active in response to an enabling signal on line 51 supplied from a controller 47 whenever a call is originated from or terminated to a remote station 4. Transmitter 41 modulates a baseband signal applied thereto upon a carrier which is selected by a frequency control signal supplied on line 52 from the controller 47. To permit instant reception of a call, the receiver 42 is constantly in an active state. The baseband signal of a received RF signal is recovered by the receiver 42 by demodulating it with a local oscillator frequency which is selected by the frequency control signal on line 52. Controller 47 derives this frequency control signal from a scanner 46 which scans across the frequency spectrum of the carriers sent from the switching office. Each of the remote stations is thus accessible to the radio channel selected by the concentrator 2.

Transmitter 41 and receiver 42 are each provided with a variable gain amplifier, not shown, which are controlled in opposite sense to each other during a half-duplex mode in response to a control signal on line 53 from controller 47 and are controlled at a fixed level during a full-duplex mode in response to a signal on line 58 from controller 47. A speech level detector 45 is connected to the input terminal of transmitter 41 to generate an output when an input signal to transmitter 41 exceeds a predetermined level. During the half-duplex mode, the controller 47 responds to the presence of an output signal from the detector 45 by increasing the gain of the variable gain amplifier of transmitter 41 and decreasing the gain of the variable gain amplifier of receiver 42 and responds to the absence of the detector 45 output by decreasing the gain of the transmitter variable gain amplifier and increasing the gain of the receiver variable gain amplifier.

Each telephone set 5 is provided with a switch which operates when it goes off-hook and applies a signal on line 54 to the controller 47 to cause it to switch the transmitter 41 into an active state. Also provided on the telephone set is a pushbutton which is operated manually when an intragroup call is attempted. The operation of this button causes a signal to be applied on line 55 to the controller 47 to allow it to distinguish between intragroup and extragroup calls. Controller 47 further includes a decoding function for translating a selective calling address sent from the controller 23 to determine whether a call it receives is destined to the own station or not. If a call is destined to the own station, the controller 47 generates a ringing signal and applies it to the telephone set. If a call is originated from within the same group of remote stations, this fact is communicated to controller 47 through receiver 42 on line 57 and generates an intragroup ringback tone and supplies it on line 56 to the transmitter 41. This intragroup ringback tone is received by the base station controller 23 to operate the switches 24. If a call is received from a subscriber external to the remote station group, the controller 47 supplies an extragroup ringback tone to the transmitter 41. In the latter case, the switches 24 are not operated.

The operation of the radio telephone system of the invention will now be described. Assume that radio channels #1 and #2 are both idle and telephone 5-1 goes off-hook to place an intragroup call to telephone 5-10. Since both radio channels are idle, the line concentrator 2 preferentially selects the #1 radio channel, so that frequency $F_1$ carrier has been sent continuously from the switching office to the remote terminals. Thus, the receivers of all the remote terminals have been tuned to the receive frequency $F_1$ of the #1 radio channel. The off-hook condition of telephone 5-1 is detected by the controller 47a in response to a signal on line 54a. Controller 47a supplies an enabling signal on line 51a to activate the transmitter 41a. Controller 47a also receives a signal on line 55a from the telephone 5-1, recognizes that the call is destined to a subscriber within the same group, generates an intragroup service request signal and a signal indicating the address (telephone) number of the calling remote station and applies them on line 56a to transmitter 41a. These signals are modulated on frequency $f_1$ carrier and transmitted to the switching office. Subsequenty, a destination address signal is dialed by the calling remote station and modulated on the same carrier and sent to the switching office. At the same time, the controller 47a is conditioned to operate the transmitter 41a and receiver 42a in a half-duplex mode.

By translating the destination address signal, the concentrator controller 23 knows that the call is directed to an intragroup subscriber and scans its busy/idle memory for the intragroup subscribers to determine if the called remote station is idle or not. If the called remote station is idle, the controller 23 generates an intragroup ringing signal which contains the selective calling signal of the called station. This ringing signal is sent to terminal 31b of transceiver 3-1, which in turn transmits it on carrier frequency $F_1$ to the remote terminals. If the called station is busy, a busy tone signal is sent from the controller 23 to the calling station.

The intragroup ringing signal on carrier $F_1$ is received by the antenna of each remote station and passed through duplexer 43 and receiver 42 to controller 47 on line 57. Each controller checks the selective calling address signal contained in the ringing signal against its own address number. The called station controller 47b detects a match between the received calling address and its own address number and proceeds to activate the transmitter 41b on line 51b, sends a signal on line 52b to lock the transmit and receive frequencies of transmitter 41b and receiver 42b to $f_1$ and $F_1$, respectively, and sends a ringing current on line 54b to the telephone set 5-10. At the same time, the controller 47b is conditioned to operate the transmitter 41b and receiver 42b in a half-duplex mode and generates an intragroup ringback tone and sends it on line 56b to the transmitter 41b, which modulates it on frequency-$f_1$ carrier for transmission to the switching office.

The concentrator controller 23 receives the intragroup ringback tone signal from the called terminal 4-10 through the terminal 31a of transceiver 3-1 and supplies a switching control signal to the duplex mode switches 24-1 to connect the terminals 31a and 31b of transceiver 3-1, thus completing a radio channel between remote stations 4-1 and 4-10. The intragroup ringback tone signal is thus relayed by base station transceiver 3-1 to the calling station 4-1. When the ringback tone is received, the concentrator controller 23 shifts the idle carrier frequency from $F_1$ to $F_2$, whereby the remote stations other than stations 4-1 and 4-10 may switch their receive channels to the new idle frequency.

When the called telephone set 5-10 goes off-hook in response to the ringing current supplied from controller 47b, the controller 47b senses this condition and terminates the intragroup ringback tone, establishing a connection between the remote stations 4-1 and 4-10 on the #1 radio channel, i.e., on transmit channel at frequency $f_1$ and receive channel at frequency $F_1$.

Since intragroup connections share the same frequency $f_n$ for transmission of signals from remote stations, half-duplex mode of operation is necessary to prevent inteference between frequencies $f_n$ transmitted simultaneously from calling and called stations. Half-duplex operation begins with one of the speech detectors 45a and 45b detecting the speech level at the input of the associated transmitter 41. If the speech level at the input of transmitter 41a exceeds a predetermined value, detector 45a signals the controller 47a increases the output level of transmitter 41a. Under this condition, controller 47a preferably suppresses the output level of the receiver 42a to cut off the speech signal of the own station which may arrive at delayed times. When this occurs, the speech level at the input of the other transmitter 41b will be low and no signal is supplied from detector 45b to the controller 47b, so that it suppresses the output level of transmitter 41b and preferably increases the output level of receiver 42b. Therefore, the speaker's voice from telephone 5-1 is transmitted on frequency-$f_1$ carrier to base station transceiver 3-1 and broadcast on frequency-$F_1$ carrier to the remote stations and is received by telephone 5-10. When the speaker's voice from telephone 5-10 at the input of transmitter 41b exceeds the predetermined level, the situation is reversed so that transmitter 41b is rendered active and receiver 42b inactive, and transmitter 41a is rendered inactive and receiver 42a active.

A call clearing signal is generated from the remote station if it goes on-hook earlier than the other party and sent to the concentrator controller 23 through transceiver 3-1. Knowing that the connection is to be cleared, the controller 23 removes the switching control signal from the duplex mode switch 24-1 to reconnect the terminals 31a and 31b of transceiver 3-1 to the concentrator switching network 22.

If a remote station desires to set up a call to an ordinary subscriber, the calling station goes off-hook without operating the intragroup button on his telephone set. In the absence of signal on the line 55, the controller 47 recognizes it as an extragroup service request and switches to a full-duplex mode and generates no switching signal for duplex mode switches 24 and transfers the call-processing signals (source and destination address numbers) to the switching system 1 and proceeds to select a two-way path between the associated subscriber line terminal and a transceiver from which the service request signal has been received and operates the switching network 22 to establish a full-duplex channel between the switching system 1 and the transceiver. During such extragroup calls, the controller 47 of the calling station does not respond to the output of speech level detector 45 and supplies a high-gain signal one line 58 to the transmitter 41 and receiver 42 to cause them to operate in a full-duplex mode.

If a call is directed to a remote station from an extragroup subscriber, the controller 23 selects a two-way path between the subscriber line terminal of the called station and one of the transceivers 3-1, 3-2 which is transmitting an idle carrier and operates the switching network 22 to establish a full-duplex channel between the switching system and the transceiver 3. Simultaneously, the controller 23 receives the necessary dialing information from the switching system 1 to pass it to the remote stations 4 to permit them to compare it against their own address number. An extragroup ringing signal is generated by the controller 47 of the called station and sent back through the switching office to the calling subscriber. A ringing current is also supplied from the controller 47 to the associated telephone set. When the called telephone goes off-hook in response thereto, the ringback tone is terminated, completing a full-duplex radio channel as in the extragroup outgoing call.

To minimize the holding time that begins with the first communication of the calling station to the switching office to the setting up of a connection, a technique known as "preorigination dialing" is preferred. With this dialing procedure, the dialing sequence takes place before the calling station's first communication with the switching office. Remote station subscriber dials the telephone number of the called station into a memory and then initiates the communication with the switching office. One major advantage of preorigination dialing is that a subscriber can dial at a slow rate without tying up a valuable radio channel. If a mistake is made, the subscriber can erase the dialed number and redial the correct number. The stored number is sent as rapidly as possible in coded form along with other call-processing information. It is also desirable that each remote station be provided with a time-out feature which times out a continued off-hook condition of a remote station.

The foregoing description shows only one preferred embodiment of the present invention. Various modifications are apparent to those skilled in the art without departing from the scope of the present invention which is only limited by the appended claims. Therefore, the embodiment shown and described is only illustrative, not restrictive.

What is claimed is:

1. A multiple access radio telephone system adapted to be connected to a telecommunication switching system which provides switched connections between subscriber line terminals thereof, comprising:
   means for establishing M two-way radio channels;
   a group of N remote stations having N corresponding subscriber line terminals in said switching system and being accessible to a selected one of said two-way radio channels, where N is greater than M; and
   a concentrator connected to said switching system and said channel establishing means for selecting an arbitrary one of said two-way radio channels and establishing a full-duplex mode connection between a switched one of said corresponding subscriber line terminals and said selected two-way radio channel in response to a first call-processing signal and establishing a half-duplex mode connection between two of said remote stations through said selected two-way radio channel in response to a second call-processing signal.

2. A multiple access radio telephone system as claimed in claim 1, wherein said concentrator comprises call-processing means responsive to each of said first and second call-processing signals for transmitting a selective calling address to said remote stations through said selected channel.

3. A multiple access radio telephone system as claimed in claim 1, wherein each of said remote stations comprises means for transmitting a ringback tone to said concentrator through said selected channel, and wherein said concentrator being responsive to said ringback tone to establish said half-duplex mode connection.

4. A multiple access radio telephone system as claimed in claim 3, wherein each of said remote stations is operable in a full-duplex mode of communication in response to said first call-processing signal and operable in a half-duplex mode of communication in response to said second call-processing signal.

5. A multiple access radio telephone system as claimed in claim 4, wherein each of said remote stations comprises a transmitter for transmitting signals on a carrier having a first radio frequency, a receiver tuned to a second radio frequency, a speech level detector for detecting when the input of said transmitter exceeds a predetermined level, and a controller, said transmitter and receiver being connected together by a duplexer to a common antenna, said controller being responsive to said second call-processing signal and to said speech level detector for enabling said transmitter when said speech level exceeds said predetermined level and disabling the transmitter when said speech level reduces below said predetermined level.

6. A multiple access radio telephone system as claimed in claim 5, wherein said controller is responsive to said second call-processing signal and to said speech level detector for disabling said receiver when said speech level exceeds said predetrermined level and enabling said receiver when said speech level reduces below said predetermined level.

7. A multiple access radio telephone system for use with a telecommunication switching system for providing switched connections between subscriber line terminals thereof, comprising:
   a concentrator switching matrix having M pairs of terminals and N terminals, the N terminals being connected to corresponding subscriber line terminals of said telecommunication switching system, where N is greater than M;
   M radio transceivers each having an input and an output terminal and a common terminal, the common terminals of the M radio transceivers being connected together to a common antenna for establishing M two-way radio channels, each of said transceivers having an associated switching means for coupling the input and output terminals thereof to an associated one of said M pairs of terminals of the concentrator switching matrix in the absence of a switching control signal and respectively coupling the input terminal of the associated transceiver to the output terminal thereof in the presence of said switching control signal;
   a group of N remote stations accessible to a selected one of said two-way radio channels; and
   control means connected to said telecommunication switching system and said transceivers for selecting an arbitrary one of said channels, said control means being responsive to a first call-processing signal for controlling said concentrator switching matrix to establish a connection between one of said corresponding subscriber line terminals and the transceiver associated with said selected channel and responsive to a second call-processing signal for applying said switching control signal to the switching means of the transceiver associated with said selected channel.

8. A multiple access radio telephone system as claimed in claim 7, wherein said control means comprises call-processing means responsive to each of said first and second call-processing signals for transmitting a selective calling address to said remote stations through said selected channel.

9. A multiple access radio telephone system as claimed in claim 7, wherein each of said remote stations comprises means for transmitting a ringback tone to said control means through said selected channel, and wherein said control means being responsive to said ringback tone to generate said switching control signal.

10. A multiple access radio telephone system as claimed in claim 9, wherein each of said remote stations is operable in a full-duplex mode of communication in response to said first call-processing signal and operable in a half-duplex mode of communication in response to said second call-processing signal.

11. A multiple access radio telephone system as claimed in claim 10, wherein each of said remote stations comprises a transmitter for transmitting signals on a carrier having a first radio frequency, a receiver tuned to a second radio frequency, a speech level detector for detecting when the input of said transmitter exceeds a predetermined level, and a controller, said transmitter and receiver being connected together by a duplexer to a common antenna, said controller being responsive to said second call-processing signal and to said speech level detector for enabling said transmitter when said speech level exceeds said predetermined level and disabling the transmitter when said speech level reduces below said predetermined level.

12. A multiple access radio telephone system as claimed in claim 11, wherein said controller is responsive to said second call-processing signal and to said speech level detector for disabling said receiver when said speech level exceeds said predetrermined level and enabling said receiver when said speech level reduces below said predetermined level.

* * * * *